US009402005B2

(12) United States Patent
Qian et al.

(10) Patent No.: US 9,402,005 B2
(45) Date of Patent: Jul. 26, 2016

(54) POWER SUPPLYING METHOD FOR WIRELESS NETWORK TERMINAL AND WIRELESS NETWORK TERMINAL (71) Applicant: Huawei Device Co., Ltd., Shenzhen, Guangdong (CN)

(72) Inventors: Dingjun Qian, Xi'an (CN); Yanguo He, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 337 days.

(21) Appl. No.: 14/138,990

(22) Filed: Dec. 23, 2013

(65) Prior Publication Data

US 2014/0120989 A1    May 1, 2014

Related U.S. Application Data (63) Continuation of application No. PCT/CN2011/076297, filed on Jun. 24, 2011.

(51) Int. Cl.
*H04M 1/00* (2006.01)
*H04M 19/08* (2006.01)
(Continued)

(52) U.S. Cl.
CPC .................. *H04M 19/08* (2013.01); *G06F 1/26* (2013.01); *G06F 1/266* (2013.01); *H04W 48/18* (2013.01)

(58) Field of Classification Search
CPC .......... H04M 19/08; G06F 1/26; G06F 1/266; G06F 3/0488; G06F 13/385; G06F 13/4068; G06F 13/4291; G06F 11/1441; G06F 11/1443; G06F 11/2015; G06F 13/36; G06F 13/374; G06F 13/4081; G06F 1/1652; G06F 1/305; G06F 2213/0042; G06F 2213/3854; G06F 3/0418; G06F 3/044; H04W 48/18; H04B 1/082; H04B 2203/5408; H04B 2203/5458; H04B 2203/5483; H04B 3/542; H04B 10/803; H04B 2203/5425; H04B 2203/5495; H04B 3/44; H04B 3/54
USPC ........................................................ 455/572
See application file for complete search history.

(56) References Cited

U.S. PATENT DOCUMENTS

2004/0185821 A1    9/2004    Yuasa
2006/0015757 A1    1/2006    Tupman et al.
(Continued)

FOREIGN PATENT DOCUMENTS

CN          1525278 A      9/2004
CN       201075704 Y       6/2008
(Continued)

OTHER PUBLICATIONS

International Search Report in corresponding PCT Patent Application No. PCT/CN2011/076297 (Apr. 5, 2012).

*Primary Examiner* — Lana N Le
(74) *Attorney, Agent, or Firm* — Leydig, Voit & Mayer, Ltd.

(57) ABSTRACT

A power supplying method for a wireless network terminal and the wireless network terminal are disclosed. The method includes: detecting potential information of two power lines of a USB (Universal Serial Bus) interface of a wireless network terminal; determining, according to the potential information of the two power lines, a type of a power supply device that is connected to the USB interface; and when the type of the power supply device is a power supply device having a communication capability, controlling the wireless network terminal to work in a predetermined communication mode, so as to implement power supply for the wireless network terminal by using the power supply device. With provided technical solutions, a cost of the wireless network terminal can be reduced, and a battery with a relatively large size is not needed, thereby facilitating miniaturization and integration of the wireless network terminal.

8 Claims, 3 Drawing Sheets (51) Int. Cl.
    *G06F 1/26*     (2006.01)
    *H04W 48/18*    (2009.01)

(56) References Cited

U.S. PATENT DOCUMENTS

| | | | | |
|---|---|---|---|---|
| 2007/0202931 A1* | 8/2007 | Lee | ........................ | H04B 3/58 |
| | | | | 455/572 |
| 2008/0272741 A1 | 11/2008 | Kanamori | | |
| 2008/0293454 A1* | 11/2008 | Kanazawa | .......... | H04L 61/2038 |
| | | | | 455/572 |
| 2010/0293302 A1 | 11/2010 | Fujii et al. | | |
| 2011/0254511 A1* | 10/2011 | Tam | ...................... | H02J 7/0068 |
| | | | | 320/162 |
| 2011/0260742 A1* | 10/2011 | Sims | ........................ | H02J 7/042 |
| | | | | 324/713 |
| 2015/0137789 A1* | 5/2015 | Furtner | .................... | G05F 5/00 |
| | | | | 323/318 |
| 2015/0349561 A1* | 12/2015 | Berggren | ................ | H02J 7/007 |
| | | | | 320/162 |

FOREIGN PATENT DOCUMENTS

| | | | |
|---|---|---|---|
| CN | 101436425 | * | 5/2009 |
| CN | 101436425 A | | 5/2009 |

* cited by examiner

FIG. 7 ately large size for the wireless network terminal in the prior art, thereby implementing power supply for the wireless network terminal through a universal serial bus (Universal Serial Bus, hereinafter referred to as USB) interface.

POWER SUPPLYING METHOD FOR WIRELESS NETWORK TERMINAL AND WIRELESS NETWORK TERMINAL

CROSS-REFERENCE TO RELATED APPLICATIONS

This application is a continuation of International Patent Application No. PCT/CN2011/076297, filed on Jun. 24, 2011, which is hereby incorporated by reference in its entirety.

FIELD

Embodiments of the present disclosure relate to the field of electronic technologies and, in particular, to a power supplying method for a wireless network terminal and the wireless network terminal.

BACKGROUND

Currently, wireless network terminals such as a mobile terminal and a wireless router network terminal are more and more widely used.

In the prior art, a power supply device of a wireless network terminal is very simple. Generally, a single battery is configured for a single wireless network terminal. In order to ensure normal working operation of the wireless network terminal, generally, it is required to configure a battery with relatively large capacity for the wireless network terminal. The battery may be connected to the body of the wireless network terminal through a contact, thereby implementing a power supply for the wireless network terminal.

The prior art has at least the following problems: It is required in the prior art to configure a battery with relatively large capacity for a wireless network terminal, which causes that a cost of the wireless network terminal to be relatively high. Moreover, because the size of the battery with relatively large capacity is also relatively large, miniaturization and integration of the wireless network terminal cannot be implemented.

SUMMARY

Embodiments of the present disclosure provide a power supplying method for a wireless network terminal and the wireless network terminal, so as to solve defects that a high cost and a large size are caused because a battery with relatively large capacity is configured for a wireless network terminal in the prior art, thereby implementing power supply for the wireless network terminal through a universal serial bus (Universal Serial Bus, hereinafter referred to as USB) interface.

An embodiment of the present disclosure provides a power supplying method for a wireless network terminal, where the method includes:

detecting potential information of two power lines of a universal serial bus interface of a wireless network terminal;
  determining, according to the potential information of the two power lines, a type of a power supply device that is connected to the universal serial bus interface; and
  when the type of the power supply device is a power supply device having a communication capability, controlling the wireless network terminal to work in a predetermined communication mode, so as to implement power supply for the wireless network terminal by using the power supply device, where the predetermined communication mode supports the power supply device having a communication capability in supplying power for the wireless network terminal, except a global system of mobile communication mode.

An embodiment of the present disclosure provides a wireless network terminal, including:

a detecting module, configured to detect potential information of two power lines of a universal serial bus interface of a wireless network terminal;
  a determining module, configured to determine, according to the potential information of the two power lines, a type of a power supply device that is connected to the universal serial bus interface; and
  a controlling module, configured to, when the type of the power supply device is a power supply device having a communication capability, control the wireless network terminal to work in a predetermined communication mode, so as to implement power supply for the wireless network terminal by using the power supply device, where the predetermined communication mode supports the power supply device having a communication capability in supplying power for the wireless network terminal, except a global system of mobile communication mode.

With the power supplying method for a wireless network terminal and the wireless network terminal according to the embodiments of the present disclosure, potential information of two power lines of a universal serial bus interface of a wireless network terminal is detected; a type of a power supply device that is connected to the universal serial bus interface is determined according to the potential information of the two power lines; and when the type of the power supply device is a power supply device having a communication capability, the wireless network terminal is controlled to work in a predetermined communication mode, so as to implement power supply for the working wireless network terminal by using the power supply device, where the predetermined communication mode is a communication mode that supports the power supply device having a communication capability in supplying power for the wireless network terminal, except a global system of mobile communication mode. By using the technical solutions in the embodiments of the present disclosure, when the type of the power supply device that is connected to the universal serial bus interface is a power supply device having a communication capability, the wireless network terminal may be controlled to work in a communication mode except the global system of mobile communication mode, so as to implement power supply for the wireless network terminal through the universal serial bus interface and so as to ensure normal working of the wireless network terminal. Compared with the prior art, it does not need to configure a battery with relatively large capacity and a relatively large size for the wireless network terminal, so that a cost of the wireless network terminal can be effectively reduced, and the battery with a relatively large size is not needed, thereby facilitating miniaturization and integration of the wireless network terminal.

BRIEF DESCRIPTION OF THE DRAWINGS

To describe the technical solutions in the embodiments of the present disclosure more clearly, the accompanying drawings required for describing the embodiments are briefly introduced in the following. Apparently, the accompanying drawings in the following description show some embodiments of the present disclosure, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present disclosure more comprehensible, the technical solutions in the embodiments of the present disclosure are clearly described in the following with reference to the accompanying drawings. Apparently, the embodiments to be described are merely a part rather than all of the embodiments of the present disclosure. All other embodiments obtained by persons of ordinary skill in the art based on the embodiments of the present disclosure without creative efforts shall fall within the protection scope of the present disclosure.

A USB (Universal Serial Bus) interface is a common interface on a wireless network terminal in the prior art. Generally, the wireless network terminal in use is connected to a personal computer (Personal Computer) through the USB interface. The USB interface generally includes four lines: two power lines and two signal lines. For example, one of the two power lines is a power line of 5 V (volts), and the other one is a grounding line. A current supply capability of a power supply of the USB interface is, for example, 500 mA (milli-amps), and a maximum current supply capability cannot exceed, for example, 600 mA.

Wireless network terminal communication modes in the prior art have the following combinations in several manners: wideband code division multiple access (Wideband Code Division Multiple Access, hereinafter referred to as WCDMA)+global system of mobile communication (Global System of Mobile communication, hereinafter referred to as GSM), time division-synchronous code division multiple access (Time Division-Synchronous Code Division Multiple Access, hereinafter referred to as TDSCDMA)+GSM, and evolution data only (Evolution Data Only, hereinafter referred to as EVDO)+GSM. Generally, in network working modes of WCDMA, TDSCDMA, and EVDO modes, an average current of a wireless network terminal is required to be lower than 500 mA. This requirement can be met by supplying power through the USB interface that is connected to the PC. Moreover, a network of a GSM mode has a relatively rigorous requirement on a power supply. Because in the GSM, transmission is timeslot transmission, transmission power may reach about 33 dBM, and a current may be usually greater than 1 A, which is far beyond a current supply capability of an ordinary USB interface, thereby causing voltage abnormality at the USB interface. This is why the wireless network terminal needs a battery for power supply.

In an embodiment of the present disclosure, a power supply device having a USB interface, for example, a PC, is used to implement power supply for a wireless network terminal. It should be noted that, herein, the USB interface of the power supply device may be a USB interface (which has a communication capability, and also has a power supply output) of an ordinary PC, and may also be a charger in a USB interface form (which does not have a communication capability, but has a power supply output). Through design of a hardware circuit and determination of software in the wireless network terminal, network switch is implemented, thereby effectively avoiding a rigorous requirement on a current supply capability of a power supply in a network of a GSM mode, finally getting rid of depending on battery power supply by a wireless terminal product in the network of the GSM mode, and implementing power supply for the wireless network terminal through the USB interface. The technical solutions in the embodiments of the present disclosure are described in detail in the following embodiments.

Figure 1:
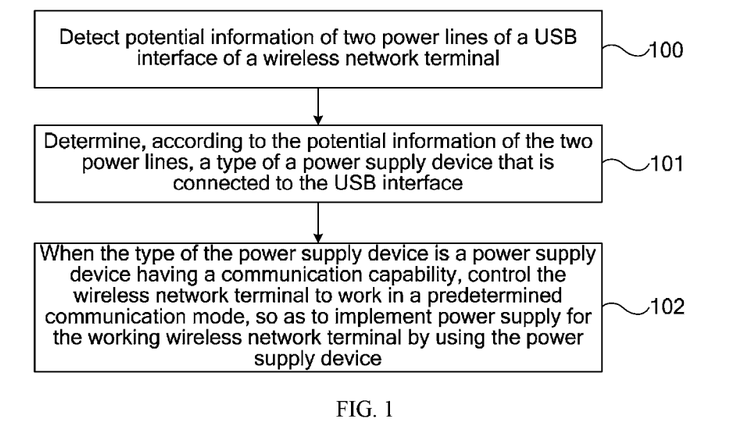
FIG. 1 is a flow chart of a power supplying method for a wireless network terminal according to an embodiment of the present disclosure.

FIG. 1 is a flow chart of a power supplying method for a wireless network terminal according to an embodiment of the present disclosure. As shown in FIG. 1, in this embodiment, a wireless network terminal performs the power supplying method of FIG. 1. For example, the wireless network terminal may be a wireless router network terminal, and may also be a mobile terminal such as a mobile phone. The power supplying method for a wireless network terminal in this embodiment may include the following steps.

Step 100: Detect potential information of two power lines of a USB interface of a wireless network terminal.

Step 101: Determine, according to the potential information of the two power lines, a type of a power supply device that is connected to the USB interface.

For example, the type of the power supply device herein includes two types. One type is a power supply device having a communication capability, for example, a PC. In this case, the PC, as the power supply device, supplies power for the wireless network terminal through the USB interface at the same time when the PC works. The other type of power supply device is an external charger device, for example, a wall charger. Although the external charger device is connected to a wireless network terminal through a USB interface, the external charger device does not have a communication connection to the wireless network terminal, and merely charges the wireless network terminal to supply power.

Step 102: When the type of the power supply device is a power supply device having a communication capability, control the wireless network terminal to work in a predetermined communication mode, so as to implement power supply for the working wireless network terminal by using the power supply device.

The predetermined communication mode is a communication mode that supports the power supply device having a communication capability in supplying power for the wireless network terminal, except GSM mode.

Specifically, power supply devices of different types can supply different currents for the wireless network terminal, for example, a current that can be supplied by a power supply device having a communication capability, such as a PC, for the wireless network terminal is about 500 mA, and a maximum current is 600 mA. When the power supply device is an external charger device, a current that can be supplied for the wireless network terminal may be a maximum allowed circulating current. The wireless network terminal needs different working currents when working in different network modes. Therefore, in this embodiment, when the type of the power supply device is a power supply device having a communication capability, the wireless network terminal may be controlled to work in a communication mode that supports the power supply device having a communication capability in supplying power for the wireless network terminal, except GSM, so as to implement power supply for the working wireless network terminal by using the power supply device. In this way, power can be supplied for the wireless network terminal by using the power supply device, thereby avoiding that the wireless network terminal adopts a battery with a large size and large capacity, and facilitating miniaturization and integration of the wireless network terminal.

With the power supplying method for a wireless network terminal according to this embodiment, potential information of two power lines of a universal serial bus interface of a wireless network terminal is detected; a type of a power supply device that is connected to the universal serial bus interface is determined according to the potential information of the two power lines; and when the type of the power supply device is a power supply device having a communication capability, the wireless network terminal is controlled to work in a predetermined communication mode, so as to implement power supply for the working wireless network terminal by using the power supply device, where the predetermined communication mode is a communication mode that supports the power supply device having a communication capability in supplying power for the wireless network terminal, except a global system of mobile communication mode. By using the technical solution in this embodiment, when the type of the power supply device that is connected to the universal serial bus interface is a power supply device having a communication capability, the wireless network terminal may be controlled to work in a communication mode except the global system of mobile communication mode, so as to implement power supply for the wireless network terminal through the universal serial bus interface and so as to ensure normal working of the wireless network terminal. Compared with the prior art, it does not need to configure a battery with relatively large capacity and a relatively large size for the wireless network terminal, so that a cost of the wireless network terminal can be effectively reduced, and the battery with a relatively large size is not needed, thereby facilitating miniaturization and integration of the wireless network terminal.

In one embodiment, step 101, "determine, according to the potential information of the two power lines, a type of a power supply device that is connected to the USB interface" in the foregoing embodiment includes: when the potential information of the two power lines indicates a high level and a low level respectively, determining that the power supply device that is connected to the USB interface is a power supply device having a communication capability, for example, a PC.

In this case, the predetermined communication mode in step 102 includes WCDMA, TDSCDMA, WIFI, WIMAX, or EVDO.

In step 102, the controlling the wireless network terminal to work in a predetermined communication mode when the type of the power supply device is the power supply device having a communication capability may include the following steps:

(1) when the type of the power supply device is a power supply device having a communication capability, acquiring a communication mode of the wireless network terminal;
(2) determining whether the communication mode of the wireless network terminal is a GSM mode; and when the communication mode of the wireless network terminal is the GSM mode, performing step (3), and otherwise, performing step (4);
(3) forcing the communication mode in which the wireless network terminal works to be switched to the predetermined communication mode, so as to implement that the power supply device can supply power for the working wireless network terminal; and
(4) performing no forced switch and maintaining normal working of the wireless network terminal, where in this case, the power supply device can supply power for the working wireless network terminal.

Specifically, by using the technical solution in the foregoing embodiment, when the power supply device is a power supply device having a communication capability, it may be determined that, a current supplied by the power supply device for the wireless network terminal can only ensure that the wireless network terminal works in the predetermined communication mode such as WCDMA, TDSCDMA, WIFI, WIMAX, or EVDO. Therefore, when it is detected that the communication mode in which the wireless network terminal works is not the predetermined communication mode but the GSM mode, the communication mode in which the wireless network terminal works is forced to be switched to the predetermined communication mode.

In one embodiment, step 101, "determine, according to the potential information of the two power lines, a type of a power supply device that is connected to the USB interface" in the foregoing embodiment includes: when the potential information of the two power lines indicates a high level, determine that the type of the power supply device that is connected to the USB interface is an external charger device.

In this case, because the external charger device may supply a maximum allowed circulating current for the wireless network terminal, the wireless network terminal can work in a network environment of any communication mode, for example, can work in a network environment of a GSM communication mode. That is to say, in this case, the wireless network terminal may control the wireless network terminal to work in the GSM mode that imposes a relatively high requirement on a current, and definitely, it can further be ensured that the wireless network terminal works in the predetermined communication mode. For example, it may be ensured that the wireless network terminal works in network environments of WCDMA+GSM, TDSCDMA+GSM, and EVDO+GSM modes. In practical use, in such a case, because the external charger device may supply a maximum allowed circulating current for the wireless network terminal, the wireless network terminal works in a network environment of any communication mode. In this case, it is unnecessary to detect the communication mode of the wireless network terminal and perform any forced switch.

In the foregoing embodiment, the foregoing steps may be implemented through design of hardware and/or a software algorithm without increasing any hardware cost, thereby getting rid of depending on a battery by the wireless network terminal. Meanwhile, during the design, a position of a battery may still be reserved in consideration of compatibility with an existing wireless network terminal product. A user that has a mobile demand may also continue to use a battery, thereby enhancing use convenience of a product.

Figure 2:
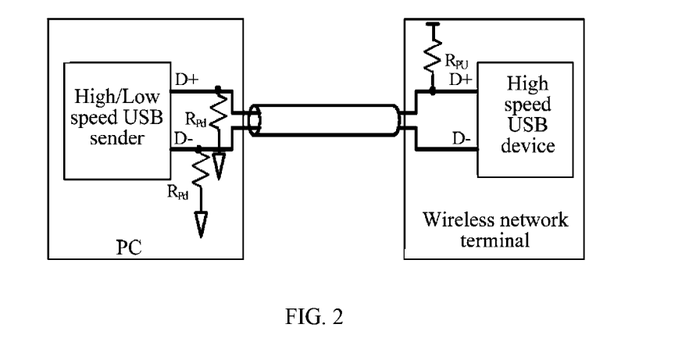
FIG. 2 is a diagram showing an application example of a power supplying method for a wireless network terminal according to an embodiment of the present disclosure.

FIG. 2 is a diagram showing an application example of a power supplying method for a wireless network terminal according to an embodiment of the present disclosure. As shown in FIG. 2, in this embodiment, a current wireless network terminal supports USB2.0 high speed. After the wireless network terminal is inserted into a USB interface of a PC machine, a D+ pin is pulled up to a high level due to voltage division by $R_{PU}$ and $R_{Pd}$, and a D− pin is pulled down to a low level due to a pull-down function of $R_{Pd}$. In this way, the wireless network terminal may determine, through software, that two power lines D+ and D− of the USB interface are at a high level and at a low level respectively, and then it may be considered that the current interface is an ordinary USB interface having a communication capability. That is, a power supply device that is connected to the USB at this time is a power supply device having a communication capability, for example, a PC machine. In this case, a current supply capability of the PC machine is only 500 mA. After a wireless network card is registered to a GSM network, for the GSM, a current supplied by a power supply is required to exceed 1 A, which inevitably causes abnormal working of the USB interface, thereby affecting client experience. In this case, a network may be forced to be registered with a WCDMA network, a TD-SCDMA network, or an EVDO network through a software switching algorithm, thereby effectively solving a problem of current supply of the power supply.

Figure 3:
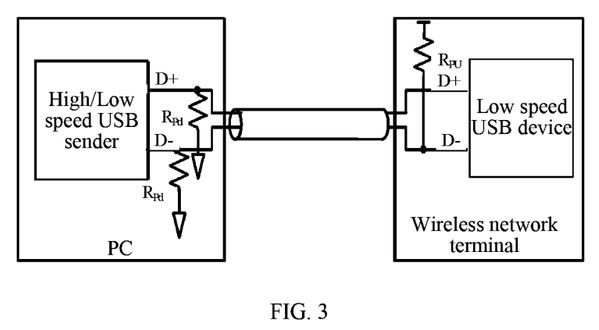
FIG. 3 is a diagram showing another application example of a power supplying method for a wireless network terminal according to an embodiment of the present disclosure.

FIG. 3 is a diagram showing another application example of a power supplying method for a wireless network terminal according to an embodiment of the present disclosure. As shown in FIG. 3, in this embodiment, a current wireless network terminal supports USB2.0 low speed. After the wireless network terminal is inserted into a USB interface of a PC machine, a D+ pin is pulled down to a low level due to voltage division by $R_{PU}$ and $R_{Pd}$, and a D− pin is pulled up to a high level. In this case, an analysis result is just opposite to that obtained in the case that the wireless network terminal supports USB2.0 high speed in FIG. 2. Referring to the analysis shown in FIG. 2, a network may also be forced to be registered with a WCDMA network, a TD-SCDMA network, or an EVDO network through a software switching algorithm, thereby effectively solving a problem of current supply of a power supply, and preventing the wireless network terminal from being registered with a GSM network, so as to avoid affecting client experience.

Figure 4:
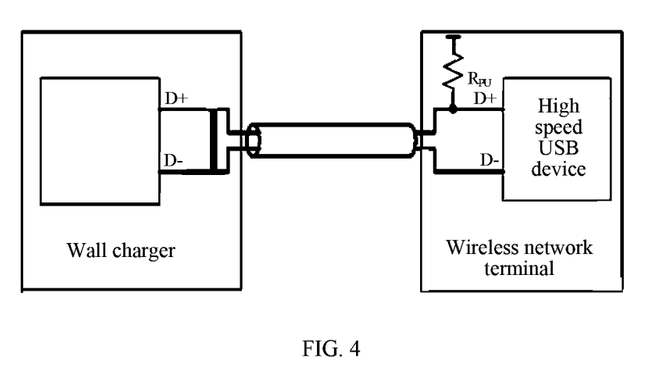
FIG. 4 is a diagram showing another application example of a power supplying method for a wireless network terminal according to an embodiment of the present disclosure.

FIG. 4 is a diagram showing another application example of a power supplying method for a wireless network terminal according to an embodiment of the present disclosure. As shown in FIG. 4, in this embodiment, a current wireless network terminal supports USB2.0 high speed, and the wireless network terminal is connected to a wall charger that is in a USB interface form. In the interior of the wall charger, two lines, D+ and D−, are connected together. Therefore, if a high speed USB interface of the wireless network device is inserted into the wall charger, both the D+ and the D− are at a high level. Software in the wireless network device may identify that what is currently connected to the USB interface of the wireless network terminal is a charger device, that is, the connection is performed without a communication capability, and only a power supply channel is provided. In this case, it may be considered that a current supplied by the wall charger may reach a maximum allowed circulating current, which may completely satisfy network registration in any case. In this case, the software does not need to interfere with a case that a device is registered with a network.

Figure 5:
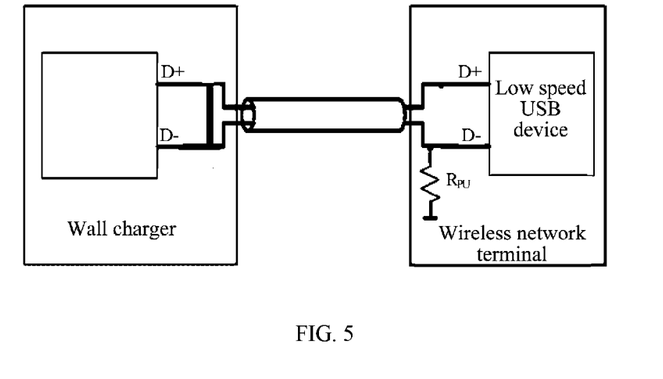
FIG. 5 is a diagram showing another application example of a power supplying method for a wireless network terminal according to an embodiment of the present disclosure.

FIG. 5 is a diagram showing another application example of a power supplying method for a wireless network terminal according to an embodiment of the present disclosure. As shown in FIG. 5, in this embodiment, a current wireless network terminal supports USB2.0 low speed, and the wireless network terminal is also connected to a wall charger that is in a USB interface form. The analysis of a process of inserting the wireless network terminal with a low speed USB interface into the wall charger is the same as that of inserting the wireless network terminal with the high speed USB interface into the wall charger in the embodiment shown in FIG. 4. Reference may be made to the description in the foregoing relevant embodiment, and details are not described herein again.

Persons of ordinary skill in the art may understand that all or part of the steps of the method embodiments may be implemented by a program instructing relevant hardware. The program may be stored in a computer readable storage medium. When the program runs, the steps of the method embodiments are performed. The storage medium may be any medium capable of storing program codes, such as a ROM, a RAM, a magnetic disk, or an optical disk.

Figure 6:
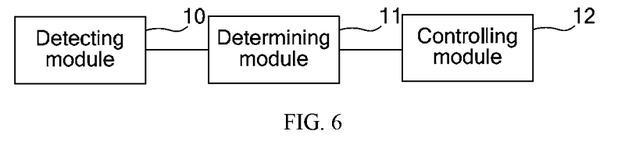
FIG. 6 is a schematic structural diagram of a wireless network terminal according to an embodiment of the present disclosure.

FIG. 6 is a schematic structural diagram of a wireless network terminal according to an embodiment of the present disclosure. As shown in FIG. 6, the wireless network terminal in this embodiment may include: a detecting module 10, a determining module 11, and a controlling module 12.

The detecting module 10 is configured to detect potential information of two power lines of a USB interface of a wireless network terminal. The determining module 11 is connected to the detecting module 10, and is configured to determine, according to the potential information of the two power lines, a type of a power supply device that is connected to the USB interface, where the potential information of the two power lines is detected by the detecting module 10. The controlling module 12 is connected to the determining module 11, and is configured to, when the determining module 11 determines that the type of the power supply device is a power supply device having a communication capability, control the wireless network terminal to work in a predetermined communication mode, so as to implement power supply for the working wireless network terminal by using the power supply device, where the predetermined communication mode is a communication mode that supports the power supply device having a communication capability in supplying power for the wireless network terminal, except a global system of mobile communication mode.

With the wireless network terminal in this embodiment, an implementation mechanism of implementing power supply for a wireless network terminal by adopting the foregoing modules is the same as an implementation mechanism adopted in the foregoing relevant method embodiment. Reference may be made to the description in the foregoing relevant method embodiment, and details are not described herein again.

It should be noted that, in addition to the foregoing modules, the wireless network terminal in this embodiment may further include hardware and/or software for implementing basic functions of the wireless network terminal.

With the wireless network terminal in this embodiment, by using the foregoing modules, potential information of two power lines of a universal serial bus interface of a wireless network terminal is detected; a type of a power supply device that is connected to the universal serial bus interface is determined according to the potential information of the two power lines; and when the type of the power supply device is a power supply device having a communication capability, the wireless network terminal is controlled to work in a predetermined communication mode, so as to implement power supply for the working wireless network terminal by using the power supply device, where the predetermined communication mode is a communication mode that supports the power supply device having a communication capability in supplying power for the wireless network terminal, except a global system of mobile communication mode. By using the technical solution in this embodiment, when the type of the power supply device that is connected to the universal serial bus interface is a power supply device having a communication capability, the wireless network terminal may be controlled to work in a communication mode except the global system of mobile communication mode, so as to implement power supply for the wireless network terminal through the universal serial bus interface and so as to ensure normal working of the wireless network terminal. Compared with the prior art, it does not need to configure a battery with relatively large capacity and a relatively large size for the wireless network terminal, so that a cost of the wireless network terminal can be effectively reduced, and the battery with a relatively large size is not needed, thereby facilitating miniaturization and integration of the wireless network terminal.

Figure 7:
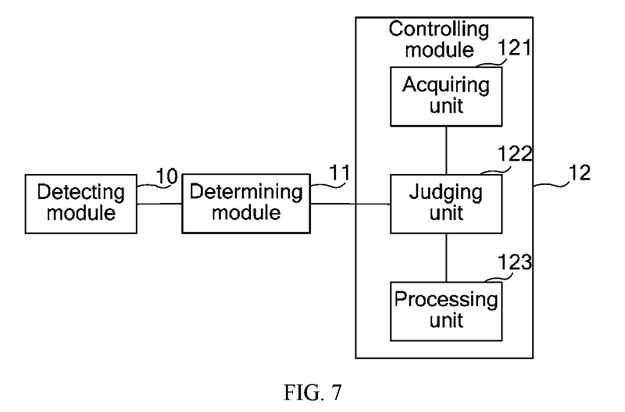
FIG. 7 is a schematic structural diagram of another wireless network terminal according to an embodiment of the present disclosure.

FIG. 7 is a schematic structural diagram of another wireless network terminal according to an embodiment of the present disclosure. As shown in FIG. 7, on the basis of the embodiment shown in FIG. 6, the determining module 11 of the wireless network terminal in this embodiment is specifically configured to, when the detecting module 10 detects that the potential information of the two power lines indicates a high level and a low level respectively, determine that the power supply device that is connected to the USB interface is a power supply device having a communication capability.

Optionally, in this embodiment, the predetermined communication mode includes WCDMA, TD-SCDMA, WIFI, WIMAX, or EVDO.

Optionally, in this embodiment, the controlling module 12 may include an acquiring unit 121, a judging unit 122, and a processing unit 123. The acquiring unit 121 is configured to, when the determining module 11 determines that the type of the power supply device is a power supply device having a communication capability, acquire a communication mode of the wireless network terminal. The judging unit 122 is connected to the acquiring unit 121, and the judging unit 122 is configured to determine whether the communication mode of the wireless network terminal is a GSM mode, where the communication mode of the wireless network terminal is acquired by the acquiring unit 121. The processing unit 123 is connected to the judging unit 122, and the processing unit 123 is configured to, when the judging unit 122 determines that the communication mode of the wireless network terminal is the GSM mode, force the communication mode of the wireless network terminal to be switched to the predetermined communication mode.

In one embodiment, the determining module 11 may further be configured to, when the detecting module 10 detects that the potential information of the two power lines indicates a high level, determine that the type of the power supply device that is connected to the USB interface is an external charger device. In this case, because the external charger device may supply a maximum allowed circulating current for the wireless network terminal, the wireless network terminal may work in a network environment of any communication mode, for example, may work in network environments of WCDMA+GSM, TDSCDMA+GSM, and EVDO+GSM modes. Correspondingly, the controlling module 12 does not need to perform any forced switch on a network in which the wireless network terminal works.

With the wireless network terminal in this embodiment, an implementation mechanism of implementing power supply for a wireless network terminal by adopting the foregoing modules is the same as an implementation mechanism adopted in the foregoing relevant method embodiment. Reference may be made to the description in the foregoing relevant method embodiment, and details are not described herein again.

With the wireless network terminal in this embodiment, by using the foregoing modules, a network mode in which the wireless network terminal works can be controlled according to a type of a power supply device that is connected to a USB interface, and power supply for the wireless network terminal may be implemented through the USB interface, so as to ensure normal working of the wireless network terminal. Compared with the prior art, it does not need to configure a battery with relatively large capacity and a relatively large size for the wireless network terminal, so that a cost of the wireless network terminal can be effectively reduced, and the battery with a relatively large size is not needed, thereby facilitating miniaturization and integration of the wireless network terminal.

The foregoing described apparatus embodiments are merely exemplary. The units described as separate parts may or may not be physically separated, and parts displayed as units may or may not be physical units, may be located in one position, or may be distributed on at least two network elements. A part of or all of the modules may be selected according to an actual requirement to achieve the objectives of the solutions in the embodiments. Persons of ordinary skill in the art may understand and implement the embodiments without creative efforts.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features of the technical solutions, as long as these modifications or replacements do not cause the essence of corresponding solutions to depart from the spirit and scope of the technical solutions in the embodiments of the present disclosure.

What is claimed is:

1. A power supplying method, the method comprising:
   detecting potential information of two power lines of a universal serial bus interface of a wireless network terminal;
   determining, according to the potential information of the two power lines, a type of a power supply device that is connected to the universal serial bus interface; and
   when the type of the power supply device is a power supply device having a communication capability, controlling the wireless network terminal to work in a predetermined communication mode so as to implement power supply for the wireless network terminal by using the power supply device, wherein the predetermined communication mode supports the power supply device having a communication capability in supplying power for the wireless network terminal, except a global system of mobile communication mode, wherein controlling the wireless network terminal to work in the predetermined communication mode comprises:
   acquiring a communication mode of the wireless network terminal, determining whether the communication mode in which the wireless network terminal works is a global system of mobile communication mode, and when the communication mode in which the wireless network terminal works is the global system of mobile communication mode, forcing the communication mode in which the wireless network terminal works to be switched to the predetermined communication mode.

2. The method according to claim 1, wherein the determining, according to the potential information of the two power lines, the type of the power supply device that is connected to the universal serial bus interface comprises:

when the potential information of the two power lines indicates a high level and a low level, respectively, determining that the power supply device that is connected to the universal serial bus interface is a power supply device having a communication capability.

3. The method according to claim 1, wherein the predetermined communication mode comprises: wideband code division multiple access, time division-synchronous code division multiple access, wireless fidelity, worldwide interoperability for microwave access, or evolution data only.

4. The method according to claim 1, wherein the determining, according to the potential information of the two power lines, the type of the power supply device that is connected to the universal serial bus interface comprises:

when the potential information of the two power lines indicates a high level, determining that the type of the power supply device that is connected to the universal serial bus interface is an external charger device.

5. A wireless network terminal, comprising:

a detecting module, configured to detect potential information of two power lines of a universal serial bus interface of the wireless network terminal;

a determining module, configured to determine, according to the potential information of the two power lines, a type of a power supply device that is connected to the universal serial bus interface; and a controlling module, configured to, when the type of the power supply device is a power supply device having a communication capability, control the wireless network terminal to work in a predetermined communication mode, so as to implement power supply for the wireless network terminal by using the power supply device, wherein the predetermined communication mode supports the power supply device having a communication capability in supplying power for the wireless network terminal, except a global system of mobile communication mode, wherein the controlling module comprises:

an acquiring unit, configured to, when the type of the power supply device is a power supply device having a communication capability, acquire a communication mode of the wireless network terminal;

a judging unit, configured to determine whether the communication mode of the wireless network terminal is a global system of mobile communication mode; and a processing unit, configured to, when the communication mode of the wireless network terminal is the global system of mobile communication mode, force the communication mode of the wireless network terminal to be switched to the predetermined communication mode.

6. The wireless network terminal according to claim 5, wherein the determining module is further configured to, when the potential information of the two power lines indicates a high level and a low level respectively, determine that the power supply device that is connected to the universal serial bus interface is a power supply device having a communication capability.

7. The wireless network terminal according to claim 5, wherein the predetermined communication mode comprises: wideband code division multiple access, time division-synchronous code division multiple access, wireless fidelity, worldwide interoperability for microwave access, or evolution data only.

8. The wireless network terminal according to claim 5, wherein the determining module is further configured to, when the potential information of the two power lines indicates a high level, determine that the type of the power supply device that is connected to the universal serial bus interface is an external charger device.

* * * * *